(12) United States Patent
Weng et al.

(10) Patent No.: US 9,097,843 B2
(45) Date of Patent: Aug. 4, 2015

(54) FIRST SURFACE MIRROR, METHOD OF MAKING THE SAME, AND SCANNER AND/OR COPIER INCLUDING THE SAME

(71) Applicant: Guardian Industries Corp., Auburn Hills, MI (US)

(72) Inventors: Jiangang Weng, Canton, MI (US); Yiwei Lu, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 218 days.

(21) Appl. No.: 13/707,831

(22) Filed: Dec. 7, 2012

(65) Prior Publication Data

US 2014/0160585 A1 Jun. 12, 2014

(51) Int. Cl.
  *G02B 5/30* (2006.01)
  *G02B 1/10* (2015.01)
  *G02B 5/08* (2006.01)

(52) U.S. Cl.
  CPC ............... *G02B 1/10* (2013.01); *G02B 5/0858* (2013.01)

(58) Field of Classification Search
  CPC ....... G02B 1/10; G02B 5/0858; H04N 1/0305
  USPC .................... 359/489.12, 488.01, 483.01, 359/485.01–485.04; 428/432, 448, 697
  See application file for complete search history.

(56) References Cited

U.S. PATENT DOCUMENTS

| | | | |
|---|---|---|---|
| 4,746,202 A | 5/1988 | Perilloux et al. | |
| 4,959,289 A * | 9/1990 | Nishikawa et al. | 430/64 |
| 5,505,989 A | 4/1996 | Jenkinson | |
| 5,527,562 A | 6/1996 | Balaba et al. | |
| 5,652,046 A * | 7/1997 | Beaufays et al. | 428/216 |
| 5,822,501 A | 10/1998 | Hattori | |
| 6,104,420 A | 8/2000 | Matsumoto | |
| 6,301,021 B1 | 10/2001 | Ohnuma | |
| 6,783,253 B2 | 8/2004 | Thomsen et al. | |
| 6,934,085 B2 | 8/2005 | Stachowiak et al. | |
| 7,276,289 B2 | 10/2007 | Lu et al. | |
| 7,621,648 B2 | 11/2009 | Wuillaume et al. | |
| 7,678,459 B2 * | 3/2010 | Scott et al. | 428/432 |
| 2006/0268367 A1 | 11/2006 | Hayashide | |
| 2008/0158702 A1 | 7/2008 | Nose et al. | |
| 2009/0126791 A1 * | 5/2009 | Lu et al. | 136/258 |
| 2012/0027933 A1 | 2/2012 | Zheng et al. | |
| 2012/0249935 A1 * | 10/2012 | Oya et al. | 349/96 |

FOREIGN PATENT DOCUMENTS

| | | |
|---|---|---|
| EP | 1 596 225 | 11/2005 |
| EP | 1 881 348 | 1/2008 |

* cited by examiner

*Primary Examiner* — Thomas K Pham
*Assistant Examiner* — Vipin Patel
(74) *Attorney, Agent, or Firm* — Nixon & Vanderhye P.C.

(57) ABSTRACT

A first surface mirror including for example a substrate, a reflective layer (including aluminum, an aluminum alloy, silver, and/or a silver alloy), a dielectric layer, and an overcoat layer, a method of making the same, and a scanner and/or copier including the same are provided.

32 Claims, 6 Drawing Sheets

FIG. 1

(RELATED ART)

FIRST SURFACE MIRROR, METHOD OF MAKING THE SAME, AND SCANNER AND/OR COPIER INCLUDING THE SAME

This invention relates to a mirror (e.g., first surface mirror) including for example a substrate, a reflective layer, a dielectric layer, and an overcoat layer, a method of making the same, and a scanner and/or copier including such a first surface mirror.

BACKGROUND

A mirror is an object that reflects light in a way that preserves much of its original quality subsequent to its contact with the mirror. Two type of mirrors are second surface mirrors (or back surface mirrors) and first surface mirrors (or front surface mirrors). Second surface mirrors typically include a glass substrate with a reflective coating on a back surface thereof (i.e., not on the front surface which is first hit by incoming light). Incoming light passes through the glass substrate of a second surface mirror before being reflected by the coating. Thus, reflected light passes through the glass substrate of a second surface mirror twice; once before being reflected and again after being reflected by the mirror coating on its way to a viewer or other element(s). In certain instances, passing through the glass substrate twice can create ambiguity in directional reflection and imperfect reflections (such as double reflected images) may sometimes result. Second surface mirrors also tend to have reduced reflection compared to first surface mirrors, because the light passes twice through the glass substrate. Mirrors such as bathroom and bedroom mirrors are typically second surface mirrors so that the glass substrate can be used to protect the reflective coating provided on the back surface.

In first surface mirrors, a reflective coating is provided on the front surface of a substrate (i.e., the surface which is first hit by incoming light) so that incoming light is reflected by the coating before it passes through the substrate. Since the light to be reflected does not pass through the substrate (e.g., glass substrate) in first surface mirrors, a first surface mirror generally has a higher reflectance and fewer imperfect reflections than a second surface mirror.

Light waves emit an electric field perpendicular to the wave's direction of travel. An electric field which rotates as a light wave travels is known as circular or elliptical polarization (depending on the pattern of rotation). A linearly polarized light wave emits an electric field which is oriented in a single direction.

When light is reflected, the plane made by the propagation direction and a vector perpendicular to the plane of a reflecting surface is referred to as the plane of incidence. One of the coordinate systems used to describe the polarization of light refers to the component of the electric field parallel to the plane of incidence as p-polarized light and the component perpendicular to the plane of incidence as s-polarized light.

Figure 1:
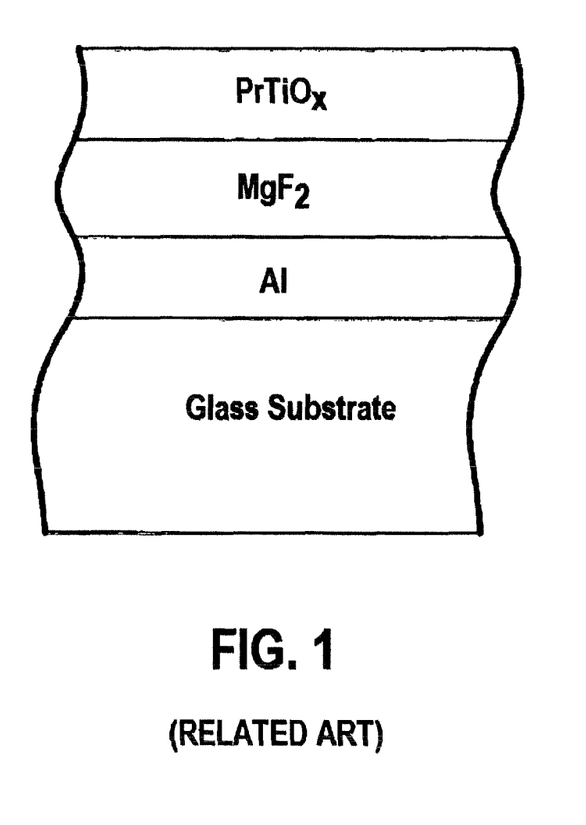
FIG. 1 illustrates a cross sectional view of a related art first surface mirror.

FIG. 1 illustrates a cross sectional view of a related art first surface mirror, including a glass substrate, an aluminum (Al) layer, a $MgF_2$ layer, and a PrTiOx layer. The related art first surface mirror of FIG. 1 has at least the following disadvantages: Exposure to $MgF_2$ is known to be detrimental to human health. Like many other rare earth elements, praseodymium is of low to moderate toxicity. Both PrTiOx and $MgF_2$ cannot be easily sputtered in large-area coaters. $MgF_2$ is costly. $MgF_2$ is a soft material which tends to lack mechanical and environmental durability.

Laser scanners and copiers (sometimes combined as one unit) are known in the art. However, it is desirable to provide good quality mirrors in such laser scanner and/or copiers. Laser scanners have been known to utilize one or more first surface mirrors.

U.S. Pat. No. 6,934,085 discloses in the background section a first surface mirror having a structure: glass/Al/$SiO_2$/$TiO_2$. Unfortunately, a first surface mirror structured as glass/Al(40 nm)/$SiO_2$(80 nm)/$TiO_2$(40 nm) does not provide adequate reflectance of both s-polarized and p-polarized light for laser scanner and/or copier applications. For example, such a first surface mirror with these layer thicknesses does not have a difference between s-polarization reflectance and p-polarization reflectance, at a wavelength of about 780 nm, of less than or equal to about 3% percent at an angles of incidence of from 0 to 60°.

SUMMARY OF EXEMPLARY EMBODIMENTS

A first surface mirror with a high reflectance on both s-polarized light and p-polarized light and a small difference between the s-polarization reflectance and the p-polarization reflectance as the angle of incidence increases. Such first surface mirrors can be used in laser scanners and/or copiers.

In example embodiments of this invention, there is provided a scanner and/or copier comprising: at least one light source; at least one first surface mirror for reflecting light from, directly or indirectly, a document in the scanner and/or copier; wherein the first surface mirror includes: (a) a glass substrate; (b) a reflective layer comprising aluminum, an aluminum alloy, silver, and/or a silver alloy; (c) a first dielectric layer comprising (i) an oxide, nitride and/or oxynitride of silicon, and/or (ii) an oxide of aluminum, wherein the reflective layer is located between at least the glass substrate and the first dielectric layer; and (d) a layer comprising (i) an oxide of titanium, (ii) an oxide of niobium, (iii) a nitride and/or oxynitride of silicon, and/or (iv) ITO, wherein the first dielectric layer is located between at least the reflective layer and the layer comprising (i) an oxide of titanium, (ii) an oxide of niobium, (iii) a nitride and/or oxynitride of silicon, and/or (iv) ITO; and wherein a difference between p-polarization reflectance and s-polarization reflectance of the first surface mirror measured at about 780 nm, for incoming light incident at all or substantially all angles from 0 to 60 degrees, is from 0 to 3%.

In certain example embodiments of this invention, there is provided a scanner and/or copier comprising: at least one light source; at least one first surface mirror for reflecting light from, directly or indirectly, a document in the scanner and/or copier; wherein the first surface mirror includes: (a) a glass substrate; (b) a reflective layer comprising aluminum, an aluminum alloy, silver, and/or a silver alloy; (c) a dielectric layer; and wherein a difference between p-polarization reflectance and s-polarization reflectance of the first surface mirror measured at about 780 nm, for incoming light incident at all or substantially all angles from 0 to 60 degrees, is from 0 to 3%.

In example embodiments of this invention, there is provided a scanner and/or copier comprising: at least one light source; at least one first surface mirror for reflecting light from, directly or indirectly, a document in the scanner and/or copier; wherein the first surface mirror includes: (a) a glass substrate; (b) a reflective layer comprising aluminum, an aluminum alloy, silver, and/or a silver alloy; (c) a first dielectric layer comprising silicon oxide from about 70-110 nm thick (more preferably from about 70-100 or 80-100 nm thick), wherein the reflective layer is located between at least the glass substrate and the first dielectric layer; and (d) a layer comprising titanium oxide from about 4-10 nm thick, wherein the first dielectric layer comprising silicon oxide is located between at least the reflective layer and the layer comprising titanium oxide.

In example embodiments of this invention, there is provided a first surface mirror comprising: a glass substrate; a reflective layer comprising aluminum, an aluminum alloy, silver, and/or a silver alloy; a dielectric layer comprising an oxide of silicon and/or an oxide of aluminum, wherein the reflective layer is located between at least the glass substrate and the dielectric layer; and a transparent conductive layer comprising indium-tin-oxide (ITO), wherein the dielectric layer is located between at least the reflective layer and the layer comprising ITO.

DETAILED DESCRIPTION OF EXEMPLARY EMBODIMENTS

A detailed description of exemplary embodiments is provided with reference to the accompanying drawings. Like reference numerals indicate like parts throughout the drawings.

A first surface mirror for a laser scanner and/or copier preferably has a high reflectance of both s-polarized light and p-polarized light and a small difference between the s-polarization reflectance and the p-polarization reflectance as the angle of incidence increases. More preferably, the difference between the s-polarization reflectance and the p-polarization reflectance of a first surface mirror for light with a wavelength of about 780 nm is less than or equal to about 3 percent at an angle of incidence of about 60°, and also at angles of incidence of one, two, three or four of the following: about 20, 30, 40 and 50 degrees. In example embodiments, a difference between p-polarization reflectance and s-polarization reflectance of the first surface mirror measured at about 780 nm, for incoming light incident at all or substantially all angles from 0 to 60 degrees, is from 0 to 3%, more preferably from 0 to 2.8%, and most preferably from 0 to 2.6%.

Figure 2:
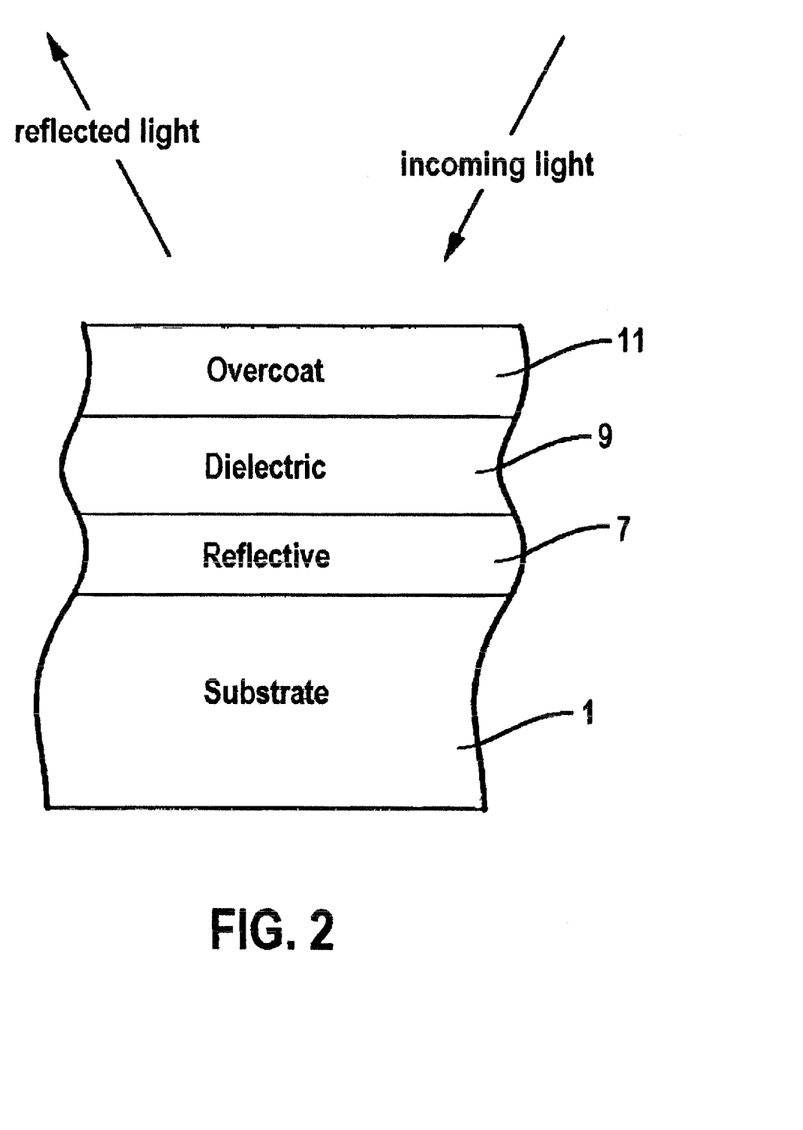
FIG. 2 illustrates a cross sectional view of a first surface mirror according to exemplary embodiments of the present invention.
Figure 6:
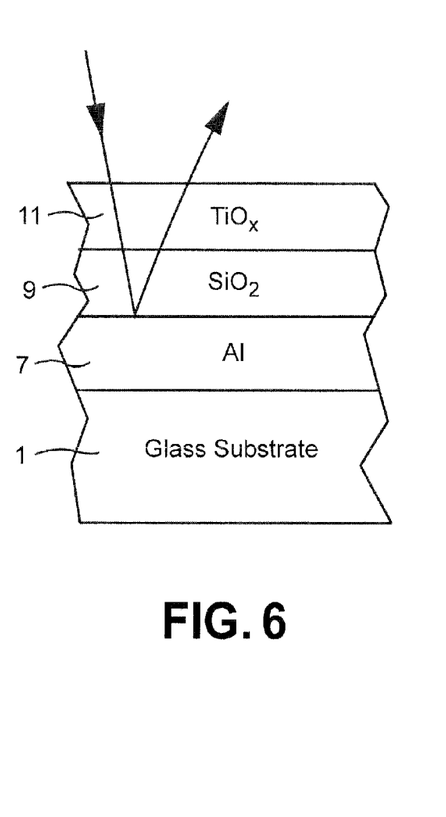
FIG. 6 illustrates a cross sectional view of a first surface mirror according to exemplary embodiments of the present invention.
Figure 7:
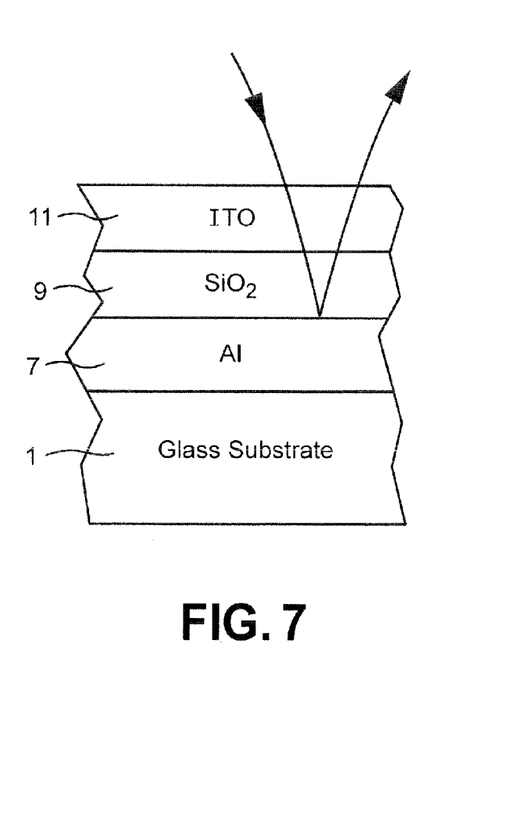
FIG. 7 illustrates a cross sectional view of a first surface mirror according to exemplary embodiments of the present invention.

FIGS. 2, 6 and 7 illustrate cross sectional views of example first surface mirrors according to exemplary embodiments of the present invention, including a substrate 1, a reflective layer 7, a dielectric layer 9, and an overcoat layer 11 which may be a dielectric or a transparent conductive oxide (TCO) such as indium-tin-oxide (ITO).

Substrate 1 in FIGS. 2, 6 and 7 may be made of any suitable material, although in certain example embodiments of this invention substrate 1 is of or includes glass.

In FIGS. 2, 6 and 7, reflective layer 7 may be made of any suitable reflective material, although in certain example embodiments of this invention reflective layer 7 is metallic or substantially metallic and is of or includes metallic aluminum (Al), silver (Ag), a silver alloy, and/or an aluminum alloy (for example, an Al—Cr alloy and/or Al 6000 Series alloy which includes mostly Al, and also some Cr, Cu, and possibly small amounts of Fe, Mg, Mn, Si, Ti and/or Zn). Reflective layer 7 may be from about 40 to 150 nm thick in certain embodiments of this invention, more preferably from about 40 to 90 nm thick, even more preferably from about 50 to 80 nm thick. For example, an aluminum reflective layer 7 may be about 65 nm thick.

Reflective layer 7 reflects the majority of incoming light before it reaches substrate 1 and directs it toward a viewer away from substrate 1, so that the mirror is referred to as a first surface mirror. In certain embodiments, reflective layer 7 has an index of refraction value "n" (at 780 nm) of from about 0.15 to 2.2 and an extinction coefficient value "k" (at 780 nm) of from about 4.0 to 8.0. When layer 7 is of Al, the index of refraction "n" of the layer 7 may be about 1.5 to 2.0, and "k" may be from about 6.0 to 8.0. But the index of refraction "n" may be as low as about 0.15 and "k" may be about 5.0 when the layer 7 is of Ag. In certain example embodiments, reflective layer 7 has a reflectivity of visible light of at least about 60%, more preferably of at least about 70%, and most preferably of at least about 80% or 90%, at one, two, three, four, or five of the following incident light angles: 20, 30, 40, 50 and 60 degrees. Moreover, in certain embodiments of this invention, reflective layer 7 is not completely opaque, as it may have a small transmission in the aforesaid wavelength region of from 0.1 to 10%, more preferably from about 0.2 to 1.5%.

In FIGS. 2, 6 and 7, dielectric layer 9 may be made of any suitable material, although in certain example embodiments of this invention dielectric layer 9 is of or includes an oxide and/or oxynitride of silicon (e.g., $SiO_2$, or other suitable stoichiometry) and/or an oxide of aluminum. The thickness of dielectric layer 9, in order to achieve the desired p and s polarized reflectance values discussed herein, depends on its refractive index "n" as well as its thickness and the refractive index of layer 11. In certain example embodiments, dielectric layer 9 may be of or including silicon oxide and may be from about 70-110 or 70-100 nm thick, more preferably from 80-100 nm thick, more preferably from 85-100 nm thick, when overcoat layer 11 is of or includes titanium oxide and is from about 4-10 nm thick, more preferably about 6 nm thick. In certain example embodiments, dielectric layer 9 may be of or including silicon oxide at from about 70-80 nm thick (e.g., about 75 nm thick) when the overcoat layer 11 is of or includes titanium oxide at about 8-10 nm thick (e.g., about 9 nm thick). Generally speaking, decrease in thickness of dielectric layer 9 can be compensated by increase in thickness of layer 11. In a case where layer 11 is not present, dielectric layer 9 may be of or including silicon oxide and may be from about 100-110 nm thick, e.g., about 105 nm thick. When silicon oxide (e.g., $SiO_2$) is replaced by aluminum oxide for layer 9, the thickness of the layer 9 with the same overcoat layer 11 will be lower because aluminum oxide has a slightly higher refractive index "n" than does silicon oxide. In certain example embodiments, layer 9 has a refractive index "n" of from about 1.4 to 1.8, more preferably from about 1.4 to 1.6.

In FIGS. 2, 6 and 7, overcoat layer 11 may be made of or include dielectric titanium oxide (e.g., see FIGS. 2 and 6), dielectric niobium oxide (e.g., see FIG. 2), dielectric silicon nitride and/or silicon oxynitride, or a TCO such as ITO (e.g., see FIGS. 2 and 7). In certain example embodiments of this invention (e.g., see FIGS. 2 and 6), layer 11 is a dielectric layer and may be of or includes an oxide of titanium (e.g., $TiO_2$, or other suitable stoichiometry), a nitride or oxynitride of silicon, or an oxide of niobium (e.g., $NbO_x$, or other suitable stoichiometry). Again, a thickness of layer 11 depends on its refractive index as well as thickness and refractive index of layer 9; an increase in thickness of layer 11 can be compensated by a decrease in thickness of layer 9. In case where there is no layer 9, then layer 11 may be an oxide of titanium for example at about 48-60 nm thick (e.g., about 52 nm thick). Niobium oxide has a similarly high refractive index as titanium oxide and therefore layer 11 may be of similar thickness when the overcoat layer 11 is of or includes niobium oxide. In certain example embodiments, overcoat layer 11 has an index of refraction "n" of from about 1.6 to 2.4, more preferably from about 2.0 to 2.4.

In another exemplary embodiment of the present invention (e.g., see FIGS. 2 and 7), overcoat layer 11 may be of or include a transparent conductive oxide such as indium tin oxide (ITO). A TCO may serve not only as a high-refractive index layer, but also may provide anti-static and anti-dust properties, so that the coating can also function as an anti-dirt coating and the layer may also reduce reflection of light before the light reaches the reflective layer 7. In certain example embodiments when overcoat layer 11 is of or includes ITO, the layer 11 may have an index of refraction "n" of from about 1.6 to 2.1, more preferably from about 1.7 to 2.0. The ITO thickness depends on its refractive index as well as thickness, as the refractive index of layer 9. An increase in thickness of layer 11 can be compensated for by a decrease in thickness of dielectric layer 9. When layer 11 is of or includes ITO, the layer 11 may have a thickness of from about 2-12 nm, more preferably from about 4-10 nm, more preferably from about 4-8 nm thick, with an example ITO thickness for layer 11 being about 6 nm. The ITO layer 11 may have a sheet resistance (Rs) of from about 30 to 1200 ohms/square, more preferably from about 500 to 900 ohms/square, with an example sheet resistance being about 700 ohms/square.

The p-polarization reflectance and s-polarization reflectance of the first surface mirror of FIGS. 2, 6 and 7 are preferably at least about 70% at about 780 nm, more preferably at least about 75% at about 780 nm. The difference between the p-polarization reflectance and s-polarization reflectance at about 780 nm region is preferably below about 5%, more preferably less than or equal to about 3%, at one, two, three, four or five of the following angles of incident light relative to the vertical: 20, 30, 40, 50 and 60 degrees. Note that the arrows indicating incoming light in FIGS. 2, 6 and 7 indicate the direction/angle of incident light relative to the vertical.

Figure 3A:
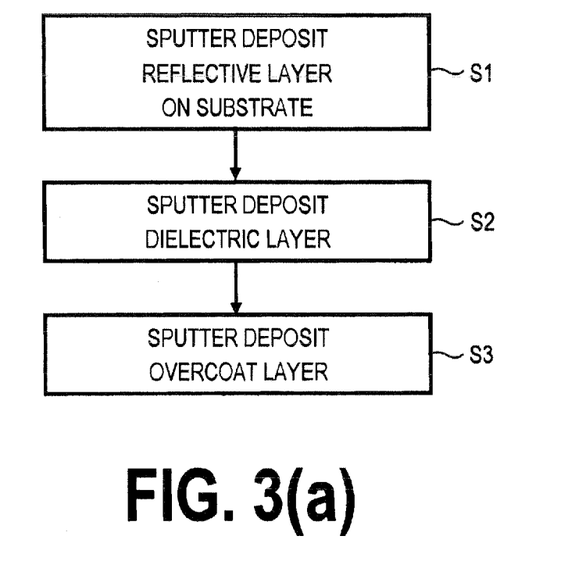
FIG. 3(a) is a flowchart illustrating a method of making the first surface mirror of FIG. 2, FIG. 6, or FIG. 7, according to exemplary embodiments.

FIG. 3(a) is a flowchart illustrating a method of making a first surface mirror of FIGS. 2, 6 and/or 7, according to exemplary embodiments. Reflective layer 7 is sputter deposited on substrate 1 in operation S1. Dielectric layer 9 is sputter deposited on the substrate 1, over the reflective layer 7, in operation S2. And overcoat layer 11 is sputter deposited on the substrate 1, over layers 7 and 9, in operation S3. In certain example embodiments of this invention, reflective layer 7 (e.g., of or including aluminum) may be sputtered onto the substrate 1 using a C-MAG rotatable cathode Al inclusive target(s) which may or may not be doped with other material(s) such as Si. For example, in sputter-depositing layer 7, there may be used a pair of substantially pure Al C-MAG targets (>=99.5% Al), Ar gas flow, DC, AC or RF power supply, and pressure of about 3 mTorr or any other suitable parameter(s)). However, planar target(s) may also be used.

Figure 3B:
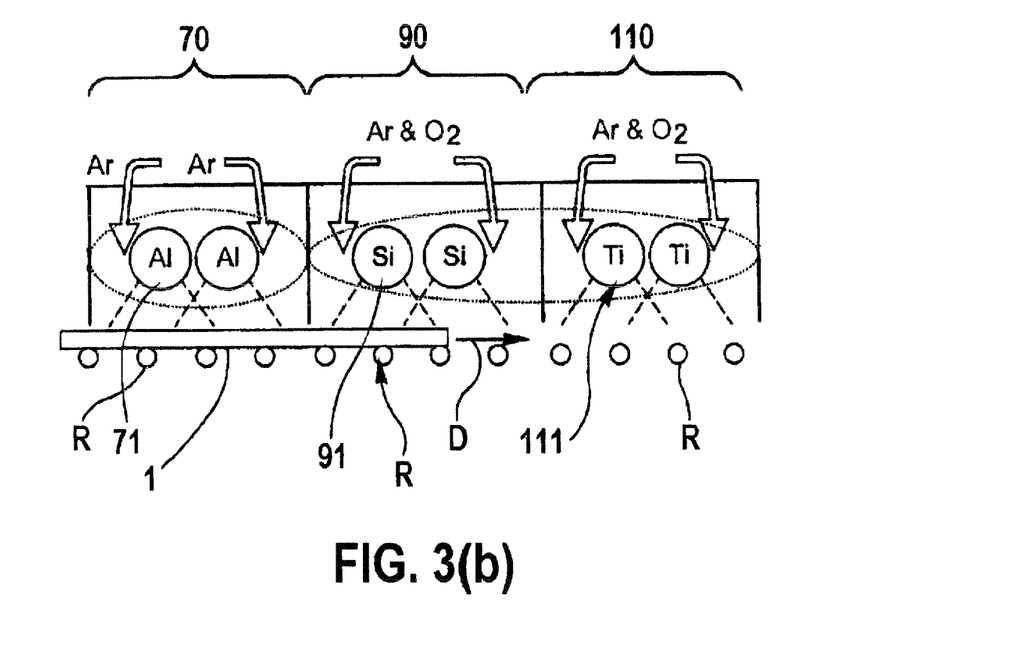
FIG. 3(b) illustrates a system which may be used to make a first surface mirror of FIG. 2 and/or FIG. 6, according to exemplary embodiments.

FIG. 3(b) illustrates a system which may be used to form the layers of the FIG. 6 embodiment first surface mirror, for example via a vacuum sputtering in-line coater. In FIG. 3(b), a glass substrate 1 moves in direction D on rollers R under the sputtering targets 71, 91, 111 of the coater. The reflective layer 7 (e.g., of or including aluminum) is formed in at least sputtering chamber 70, the dielectric layer 9 (e.g., of or including silicon oxide) is formed in at least sputtering chamber 90, and overcoat layer 11 (e.g., of or including titanium oxide) is formed in at least sputtering chamber 110. As substrate 1 moves on in direction D, chamber 70 sputter-deposits the reflective layer 7 using Al sputtering targets 71 with at least Ar gas, chamber 90 sputter-deposits dielectric layer 9 using Si or Si/Al sputtering targets 91 using at least oxygen and argon gas, and chamber 110 sputter-deposits overcoat layer 11 using Ti or TiOx sputtering target(s) 111 and oxygen and/or argon gas. The first surface mirror of can be easily sputtered in large-area coaters.

Figure 4:
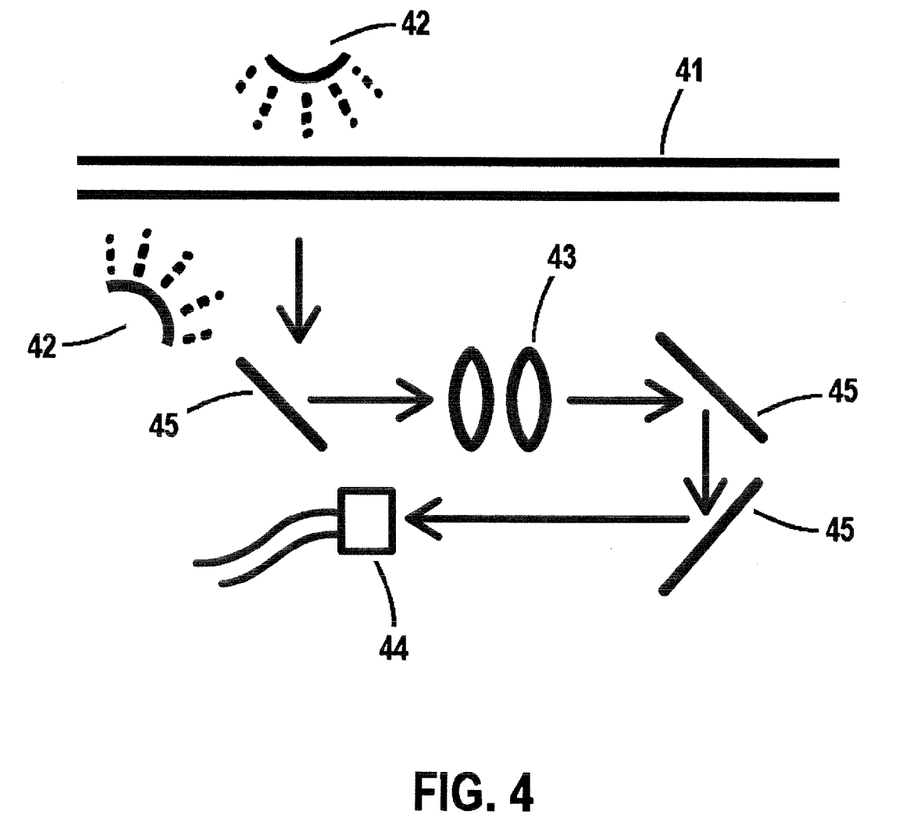
FIG. 4 illustrates a scanner and/or copier which may include the first surface mirror of FIG. 2, FIG. 6, or FIG. 7, according to exemplary embodiments.

FIG. 4 illustrates a scanner and/or copier which may include a glass plate 41, one or more light source(s) 42 (e.g., 780 nm laser), one or more lens(es) 43, one or more image sensor(s) 44, and one or more first surface mirror(s) 45. One or more of the first surface mirror(s) 45 may be a first surface mirrors of any of FIGS. 2, 6 and/or 7 discussed herein. At least one of the light source(s) 42 illuminate an object (e.g., document) on glass plate 41. The one or more light source(s) 42 may be made of any object(s) which emits light. An image of/from the object (e.g., document) on glass plate 41 is reflected by the one or more first surface mirror(s) 45. Thus, the first surface mirror(s) reflect light from, directly or indirectly, a document in the scanner and/or copier (e.g., combination scanner/copier). One or more of the first surface mirror(s) 45 may optionally be slightly curved to focus the image it reflects onto a smaller surface. The scanner and/or copier of FIG. 4 may include any number of first surface mirror(s) 45. One or more lens(es) 43 may be used anywhere along the path of the reflected image, which is directed to the one or more image sensor(s) 44.

EXAMPLE

The following exemplary embodiment of the first surface mirror of FIG. 6 was made and tested, but is not intended to be limiting. The example below is compared to a Comparative Example (CE) similar to the related art first surface mirror of FIG. 1 in order to illustrate example advantages associated with certain embodiments of this invention.

In this example, substrate 1 is glass, reflective layer 7 is aluminum with a thickness of at least 40-50 nm, dielectric layer 9 is silicon dioxide with a thickness of about 85 nm, and overcoat layer 11 is titanium oxide with a thickness of about 6 nm.

Figure 5:
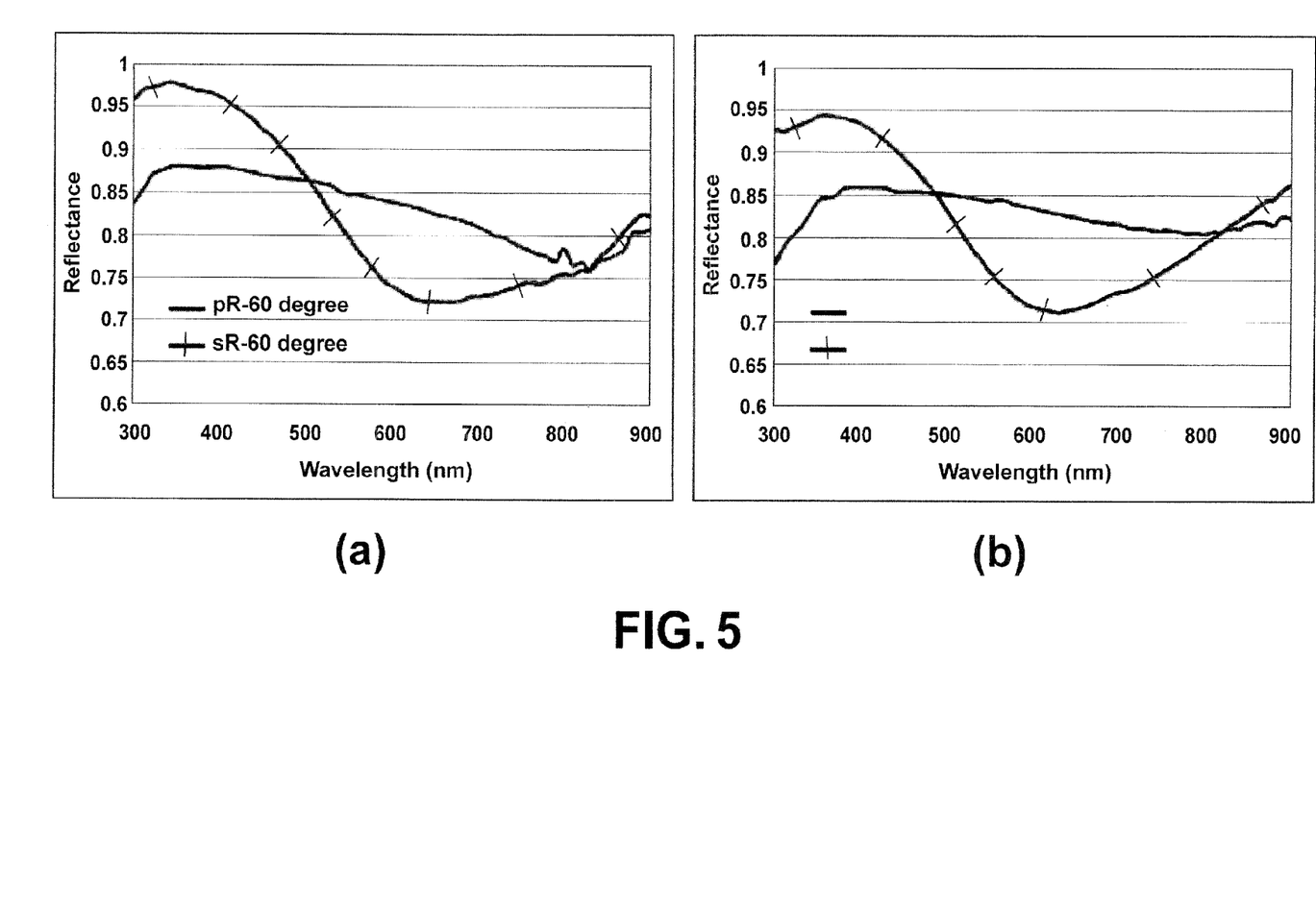
FIG. 5 illustrates reflectance data of the related art first surface mirror of FIG. 1 and an exemplary embodiment of the first surface mirror of FIG. 2 and/or FIG. 6.

FIG. 5(a) illustrates reflectance data of related art first surface mirror of FIG. 1 and FIG. 5(b) illustrates reflectance data of the preceding example embodiment from FIG. 6 over a range of wavelengths (nm), where "pR-60 degree" is p-polarization reflectance of the mirror at a 60° angle of incidence and "sR-60 degree" is the s-polarization reflectance of the mirror at a 60° angle of incidence. It can be seen in FIG. 5(b) that the difference between p-polarized light reflectance and s-polarized light reflectance at about 780 nm is very small, which is desirable. While the optics of FIG. 5(a) are adequate for certain purposes, $MgF_2$ from the mirror of FIGS. 1 and 5(a) is undesirable as explained above in the background (e.g., it is desirable for first surface mirrors herein to be free of, or substantially free of MgF$_2$).

Table 1 illustrates reflectance data of the related art first surface mirror of FIG. 1 for light waves with a 780 nm wavelength at a series of angles of incidence, where ΔR is the difference between the p-polarization reflectance and s-polarization reflectance (for example, 0.030 for ΔR is a 3% difference between s and p polarization reflectance for light incident at 60 degrees from the vertical).

TABLE 1

| Incident angle | 20° | 30° | 40° | 50° | 60° |
|---|---|---|---|---|---|
| p-polarization reflectance | 0.732 | 0.732 | 0.744 | 0.759 | 0.778 |
| s-polarization reflectance | 0.732 | 0.735 | 0.735 | 0.748 | 0.748 |
| ΔR | 0.000 | −0.003 | 0.009 | 0.012 | 0.030 |

Table 2 illustrates reflectance data of the preceding example first surface mirror of FIG. 6 for light waves with a 780 nm wavelength at a series of angles of incidence, where ΔR is the difference between the p-polarization reflectance and s-polarization reflectance (for example, 0.026 for ΔR is a 2.6% difference between s and p polarization reflectance for light incident at 60 degrees from the vertical).

TABLE 2

| Incident angle | 20° | 30° | 40° | 50° | 60° |
|---|---|---|---|---|---|
| p-polarization reflectance | 0.757 | 0.766 | 0.774 | 0.784 | 0.809 |
| s-polarization reflectance | 0.750 | 0.752 | 0.758 | 0.768 | 0.783 |
| ΔR | 0.007 | 0.014 | 0.016 | 0.016 | 0.026 |

As shown in Table 2, exemplary embodiments of first surface mirror of FIG. 6 provide the benefit of a ΔR which is less than or equal to 3% for a light wave with a 780 nm wavelength at a 60° angle of incidence. Note that the 60 degree angle of incidence means angled 60 degrees relative to the vertical, where the "vertical" direction extends substantially perpendicular to the substrate and mirror coating thereon. Table 2 shows that a p-polarization reflectance of the first surface mirror, measured at 780 nm for incoming light incident at an angle of 60 degrees, was 80.9%, an s-polarization reflectance of the first surface mirror, measured at 780 nm for incoming light incident at an angle of 60 degrees, was 78.3%.

In example embodiments of this invention, there is provided a scanner and/or copier comprising: at least one light source; at least one first surface mirror for reflecting light from, directly or indirectly, a document in the scanner and/or copier; wherein the first surface mirror includes: (a) a glass substrate; (b) a reflective layer comprising aluminum, an aluminum alloy, silver, and/or a silver alloy; (c) a first dielectric layer comprising (i) an oxide, nitride and/or oxynitride of silicon, and/or (ii) an oxide of aluminum, wherein the reflective layer is located between at least the glass substrate and the first dielectric layer; and (d) a layer comprising (i) an oxide of titanium, (ii) an oxide of niobium, (iii) a nitride and/or oxynitride of silicon, and/or (iv) ITO, wherein the first dielectric layer is located between at least the reflective layer and the layer comprising (i) an oxide of titanium, (ii) an oxide of niobium, (iii) a nitride and/or oxynitride of silicon, and/or (iv) ITO; and wherein a difference between p-polarization reflectance and s-polarization reflectance of the first surface mirror measured at about 780 nm, for incoming light incident at all or substantially all angles from 0 to 60 degrees, is from 0 to 3%.

In the scanner and/or copier of the immediately preceding paragraph, a p-polarization reflectance of the first surface mirror, measured at about 780 nm for incoming light incident at an angle of 60 degrees, may be at least 70 percent, and an s-polarization reflectance of the first surface mirror, measured at about 780 nm for incoming light incident at an angle of 60 degrees, may be at least 70 percent.

In the scanner and/or copier of any of the preceding two paragraphs, a p-polarization reflectance of the first surface mirror, measured at about 780 nm for incoming light incident at all or substantially all angles from 0 to 60 degrees, may be at least 75 percent, and an s-polarization reflectance of the first surface mirror, measured at about 780 nm for incoming light incident at all or substantially all angles from 0 to 60 degrees, may be at least 75 percent.

In the scanner and/or copier of any of the preceding three paragraphs, a p-polarization reflectance of the first surface mirror, measured at about 780 nm for incoming light incident at an angle of 60 degrees, may be at least 78 percent, and an s-polarization reflectance of the first surface mirror, measured at about 780 nm for incoming light incident at an angle of 60 degrees, may be at least 78 percent.

In the scanner and/or copier of any of the preceding four paragraphs, a p-polarization reflectance of the first surface mirror, measured at about 780 nm for incoming light incident at an angle of 60 degrees, may be at least 80 percent.

In the scanner and/or copier of any of the preceding five paragraphs, a difference between p-polarization reflectance and s-polarization reflectance of the mirror measured at about 780 nm, for incoming light incident at all or substantially all angles from 0 to 60 degrees, may be from 0 to 2.8%.

In the scanner and/or copier of any of the preceding six paragraphs, a difference between p-polarization reflectance and s-polarization reflectance of the mirror measured at about 780 nm, for incoming light incident at all or substantially all angles from 0 to 60 degrees, may be from 0 to 2.6%.

In the scanner and/or copier of any of the preceding seven paragraphs, the reflective layer may comprise or consist essentially of aluminum.

In the scanner and/or copier of any of the preceding eight paragraphs, the first dielectric layer may comprises or consist essentially of silicon oxide, and may be from 85-100 nm thick.

In the scanner and/or copier of any of the preceding nine paragraphs, the layer comprising (i) an oxide of titanium, (ii) an oxide of niobium, (iii) a nitride and/or oxynitride of silicon, and/or (iv) ITO, may be an overcoat layer and may be an uppermost layer of the coating.

In the scanner and/or copier of any of the preceding ten paragraphs, (a) the layer comprising (i) an oxide of titanium, (ii) an oxide of niobium, (iii) a nitride and/or oxynitride of silicon, and/or (iv) ITO, may comprise or consist essentially of ITO, or (b) the layer comprising (i) an oxide of titanium, (ii) an oxide of niobium, (iii) a nitride and/or oxynitride of silicon, and/or (iv) ITO, may comprise or consist essentially of titanium oxide and may be from 4 to 10 nm thick.

In the scanner and/or copier of any of the preceding eleven paragraphs, the first dielectric layer may comprise or consist essentially of silicon oxide and may be from about 85-100 nm thick, and the layer comprising (i) an oxide of titanium, (ii) an oxide of niobium, (iii) a nitride and/or oxynitride of silicon, and/or (iv) ITO may comprise or consist essentially of titanium oxide and may be from about 4-10 nm thick.

In the scanner and/or copier of any of the preceding twelve paragraphs, the reflective layer may have a thickness of at least 40 nm.

In the scanner and/or copier of any of the preceding thirteen paragraphs, the first dielectric layer may be located between and directly contacting each of the reflective layer and the layer comprising (i) an oxide of titanium, (ii) an oxide of niobium, (iii) a nitride and/or oxynitride of silicon, and/or (iv) ITO.

In the scanner and/or copier of any of the preceding fourteen paragraphs, the light source may be a 780 nm laser, and optionally a plurality of said first surface mirrors may be provided in the scanner and/or copier.

In example embodiments of this invention, there is provided a scanner and/or copier comprising: at least one light source; at least one first surface mirror for reflecting light from, directly or indirectly, a document in the scanner and/or copier; wherein the first surface mirror includes: (a) a glass substrate; (b) a reflective layer comprising aluminum, an aluminum alloy, silver, and/or a silver alloy; (c) a first dielectric layer comprising silicon oxide from about 70-110 nm thick (more preferably from about 70-100 nm, even more preferably from about 80-100 nm), wherein the reflective layer is located between at least the glass substrate and the first dielectric layer; and (d) a layer comprising titanium oxide from about 4-10 nm thick, wherein the first dielectric layer comprising silicon oxide is located between at least the reflective layer and the layer comprising titanium oxide.

In the scanner and/or copier of the immediately preceding paragraph, a difference between p-polarization reflectance and s-polarization reflectance of the first surface mirror measured at about 780 nm, for incoming light incident at all or substantially all angles from 0 to 60 degrees, may be from 0 to 3%.

In the scanner and/or copier of any of the preceding two paragraphs, a difference between p-polarization reflectance and s-polarization reflectance of the first surface mirror measured at about 780 nm, for incoming light incident at each of angles of 10, 30, and 60 degrees, may be from 0 to 3%.

In example embodiments of this invention, there is provided a first surface mirror comprising: a glass substrate; a reflective layer comprising aluminum, an aluminum alloy, silver, and/or a silver alloy; a dielectric layer comprising an oxide of silicon and/or an oxide of aluminum, wherein the reflective layer is located between at least the glass substrate and the dielectric layer; and a transparent conductive layer comprising indium-tin-oxide (ITO), wherein the dielectric layer is located between at least the reflective layer and the layer comprising ITO.

For the first surface mirror of the immediately preceding paragraph, a difference between p-polarization reflectance and s-polarization reflectance of the mirror measured at about 780 nm, for incoming light incident at an angle of 60 degrees, may be from 0 to 3%, more preferably from about 0 to 2.8%.

For the first surface mirror of any of the preceding two paragraphs, a p-polarization reflectance of the first surface mirror, measured at about 780 nm for incoming light incident at an angle of 60 degrees, may be at least 70 percent, and an s-polarization reflectance of the first surface mirror, measured at about 780 nm for incoming light incident at an angle of 60 degrees, may be at least 70 percent.

In the first surface mirror of any of the preceding three paragraphs, the reflective layer may comprise or consist essentially of aluminum.

In the first surface mirror of any of the preceding four paragraphs, the dielectric layer may comprises or consist of silicon oxide (e.g., $SiO_2$).

In the first surface mirror of any of the preceding five paragraphs, the layer comprising ITO may be an overcoat layer and may be an uppermost layer of the coating.

In the first surface mirror of any of the preceding six paragraphs, the layer comprising ITO may be from about 4 to 8 nm thick.

In the first surface mirror of any of the preceding seven paragraphs, the dielectric layer may be located between and directly contacting each of the reflective layer and the layer comprising ITO.

A scanner and/or copier may include at least one first surface mirror according to any of the preceding eight paragraphs. The scanner and/or copier (e.g., combination scanner/copier) may include at least one light source (e.g., 780 nm laser), and at least one such first surface mirror for reflecting light from, directly or indirectly, a document in the scanner and/or copier.

The forgoing exemplary embodiments are intended to provide an understanding of the disclosure to one of ordinary skill in the art. The forgoing description is not intended to limit the inventive concept described in this application, the scope of which is defined in the following claims.

What is claimed is:

1. A scanner and/or copier comprising:
   at least one light source;
   at least one first surface mirror for reflecting light from, directly or indirectly, a document in the scanner and/or copier;
   wherein the first surface mirror includes:
   (a) a glass substrate;
   (b) a reflective layer comprising at least one of: aluminum, an aluminum alloy, silver, and a silver alloy;
   (c) a first dielectric layer comprising: (i) at least one of an oxide, nitride and oxynitride of silicon, and/or (ii) an oxide of aluminum, wherein the reflective layer is located between at least the glass substrate and the first dielectric layer; and
   (d) a layer comprising at least one of: (i) an oxide of titanium, (ii) an oxide of niobium, (iii) a nitride and/or oxynitride of silicon, and (iv) ITO, wherein the first dielectric layer is located between at least the reflective layer and the layer comprising at least one of: (i) an oxide of titanium, (ii) an oxide of niobium, (iii) a nitride and/or oxynitride of silicon, and (iv) ITO;
   wherein a difference between p-polarization reflectance and s-polarization reflectance of the first surface mirror measured at about 780 nm, for incoming light incident at substantially all angles from 0 to 60 degrees, is from 0 to 3%; and
   wherein: a p-polarization reflectance of the first surface minor, measured at about 780 nm for incoming light at an angle of 60 degrees is at least 70 percent; and an s-polarization reflectance of the first surface mirror, measured at about 780 nm for incoming light incident at an angle of 60 degrees least 70 percent.

2. The scanner and/or copier of claim 1, wherein:
   a p-polarization reflectance of the first surface mirror, measured at about 780 nm for incoming light incident at an angle of 60 degrees, is at least 78 percent,
   an s-polarization reflectance of the first surface mirror, measured at about 780 nm for incoming light incident at an angle of 60 degrees, is at least 78 percent.

3. The scanner and/or copier of claim 1, wherein a p-polarization reflectance of the first surface mirror, measured at about 780 nm for incoming light incident at an angle of 60 degrees, is at least 80 percent.

4. The scanner and/or copier of claim 1, wherein a difference between p-polarization reflectance and s-polarization reflectance of the mirror measured at about 780 nm, for incoming light incident at substantially all angles from 0 to 60 degrees, is from 0 to 2.8%.

5. The scanner and/or copier of claim 1, wherein a difference between p-polarization reflectance and s-polarization reflectance of the mirror measured at about 780 nm, for incoming light incident at substantially all angles from 0 to 60 degrees, is from 0 to 2.6%.

6. The scanner and/or copier of claim 1, wherein the reflective layer comprises aluminum.

7. The scanner and/or copier of claim 1, wherein the reflective layer consists essentially of aluminum.

8. The scanner and/or copier of claim 1, wherein the first dielectric layer comprises silicon oxide.

9. The scanner and/or copier of claim 8, wherein the first dielectric layer is from 85-100 nm thick.

10. The scanner and/or copier of claim 1, wherein the first dielectric layer consists essentially of $SiO_2$.

11. The scanner and/or copier of claim 1, wherein the layer comprising (i) an oxide of titanium, (ii) an oxide of niobium, (iii) a nitride and/or oxynitride of silicon, and/or (iv) ITO, is an overcoat layer and is an uppermost layer of the coating.

12. The scanner and/or copier of claim 1, wherein the layer comprising at least one of (i) an oxide of titanium, (ii) an oxide of niobium, (iii) a nitride and/or oxynitride of silicon, and (iv) ITO, comprises ITO.

13. The scanner and/or copier of claim 1, wherein the layer comprising at least one of (i) an oxide of titanium, (ii) an oxide of niobium, (iii) a nitride and/or oxynitride of silicon, and (iv) ITO, comprises titanium oxide.

14. The scanner and/or copier of claim 13, wherein the layer comprising titanium oxide is from 4 to 10 nm thick.

15. The scanner and/or copier of claim 1, wherein the first dielectric layer comprises silicon oxide and is from about 85-100 nm thick, and
the layer comprising at least one of (i) an oxide of titanium, (ii) an oxide of niobium, (iii) a nitride and/or oxynitride of silicon, and (iv) ITO, comprises titanium oxide and is from about 4-10 nm thick.

16. The scanner and/or copier of claim 1, wherein the reflective layer has a thickness of at least 40 nm.

17. The scanner and/or copier of claim 1, wherein the first dielectric layer is located between and directly contacting each of the reflective layer and the layer comprising at least one of (i) an oxide of titanium, (ii) an oxide of niobium, (iii) a nitride and/or oxynitride of silicon, and (iv) ITO.

18. The scanner and/or copier of claim 1, wherein the light source is a 780 nm laser, and optionally wherein a plurality of said first surface mirrors are provided in the scanner and/or copier.

19. The scanner and/or copier of claim 1, wherein a difference between p-polarization reflectance and s-polarization reflectance of the first surface mirror measured at about 780 nm, for incoming light incident at all angles from 0 to 60 degrees, is from 0 to 3%.

20. A scanner and/or copier comprising:
at least one light source:
at least one first surface mirror for reflecting light from, directly or indirectly, a document in the scanner and/or copier;
wherein the first surface mirror includes:
(a) a glass substrate;
(b) a reflective layer comprising at least one of: aluminum, an aluminum alloy, silver, and a silver alloy;
(c) a first dielectric layer comprising: (i) at least one of an oxide nitride and oxynitride of silicon, and/or (ii) an oxide of aluminum, wherein the reflective layer is located between at least the glass substrate and the first dielectric layer; and
(d) a layer comprising at least one of: (i) an oxide of titanium, (ii) an oxide of niobium, (iii) a nitride and/or oxynitride of silicon, and (iv) ITO, wherein the first dielectric layer is located between at least the reflective layer and the layer comprising at least one of: (i) an oxide of titanium, (ii) an oxide of niobium, (iii) a nitride and/or oxynitride of silicon, and (iv) ITO;
wherein a difference between p-polarization reflectance and s-polarization reflectance of the first surface mirror measured at about 780 nm, for incoming light incident at substantially all angles from 0 to 60 degrees, is from 0 to 3%; and
wherein: a p-polarization reflectance of the first surface minor, measured at about 780 nm for incoming light incident at substantially all angles from 0 to 60 degrees, is at least 75 percent, and an s-polarization reflectance of the first surface mirror, measured at about 780 nm for incoming light incident at substantially all angles from 0 to 60 degrees, is at least 75 percent.

21. A scanner and/or copier comprising:
at least one light source;
at least one first surface mirror for reflecting light from, directly or indirectly, a document in the scanner and/or copier;
wherein the first surface mirror includes:
(a) a glass substrate;
(b) a reflective layer comprising at least one of: aluminum, an aluminum alloy, silver, and a silver alloy;
(c) a dielectric layer;
wherein a difference between p-polarization reflectance and s-polarization reflectance of the first surface mirror measured at about 780 nm, for incoming light incident at all angles from 0 to 60 degrees, is from 0 to 3%; and
wherein: a p-polarization reflectance of the first surface mirror, measured at about 780 nm for incoming light incident at an angle of 60 degrees, is at least 70 percent; and an s-polarization reflectance of the first surface mirror, measured at about 780 nm for incoming light incident at an angle of 60 degrees, is at least 70 percent.

22. A scanner and/or copier comprising:
at least one light source;
at least one first surface mirror for reflecting light from, directly or indirectly, a document in the scanner and/or copier;
wherein the first surface mirror includes:
(a) a glass substrate;
(b) a reflective layer comprising at least one of aluminum, an aluminum alloy, silver, and a silver alloy;
(c) a first dielectric layer comprising silicon oxide from about 70-110 nm thick, wherein the reflective layer is located between at least the glass substrate and the first dielectric layer; and
(d) a layer comprising titanium oxide from about 4-10 nm thick, wherein the first dielectric layer comprising silicon oxide is located between at least the reflective layer and the layer comprising titanium oxide; and
wherein: a p-polarization reflectance of the first surface mirror, measured at about 780 nm for incoming light incident at an angle of 60 degrees, is at least 70 percent; and an s-polarization reflectance of the first surface mirror, measured at about 780 nm for incoming light incident at an angle of 60 degrees, is at least 70 percent.

23. The scanner and/or copier of claim 22, wherein a difference between p-polarization reflectance and s-polarization reflectance of the first surface mirror measured at about 780 nm, for incoming light incident at substantially all angles from 0 to 60 degrees, is from 0 to 3%.

24. The scanner and/or copier of claim 22, wherein a difference between p-polarization reflectance and s-polarization reflectance of the first surface mirror measured at about 780 nm, for incoming light incident at angles of 10, 30, and 60 degrees, is from 0 to 3%, and wherein the first dielectric layer comprising silicon oxide is from about 80-100 nm thick.

25. A first surface mirror comprising:
a glass substrate;
a reflective layer comprising at least one of aluminum, an aluminum alloy, silver, and a silver alloy;
a dielectric layer comprising an oxide of silicon and/or an oxide of aluminum, wherein the reflective layer is located between at least the glass substrate and the dielectric layer;
a transparent conductive layer comprising indium-tin-oxide (ITO), wherein the dielectric layer is located between at least the reflective layer and the layer comprising ITO; and
wherein: a p-polarization reflectance of the first surface mirror, measured at about 780 nm for incoming light incident at an angle of 60 degrees, is at least 70 percent; and an s-polarization reflectance of the first surface mirror, measured at about 780 nm for incoming light incident at an angle of 60 degrees, is at least 70 percent.

26. The first surface mirror of claim 25, wherein a difference between p-polarization reflectance and s-polarization reflectance of the mirror measured at about 780 nm, for incoming light incident at an angle of 60 degrees, is from 0 to 3%.

27. The first surface mirror of claim 25, wherein the reflective layer comprises aluminum.

28. The first surface mirror of claim 25, wherein the dielectric layer comprises silicon oxide.

29. The first surface mirror of claim 25, wherein the layer comprising ITO is an overcoat layer and is an uppermost layer of the coating.

30. The first surface mirror of claim 25, wherein the layer comprising ITO is from about 4 to 8 nm thick.

31. The first surface mirror of claim 25, wherein the dielectric layer is located between and directly contacting each of the reflective layer and the layer comprising ITO.

32. A scanner and/or copier comprising a first surface mirror according to claim 25.

* * * * *